United States Patent
Sigal et al.

(10) Patent No.: US 10,061,986 B2
(45) Date of Patent: Aug. 28, 2018

(54) SYSTEMS AND METHODS FOR IDENTIFYING ACTIVITIES IN MEDIA CONTENTS BASED ON PREDICTION CONFIDENCES

(71) Applicant: Disney Enterprises, Inc., Burbank, CA (US)

(72) Inventors: Leonid Sigal, Pittsburgh, PA (US); Shugao Ma, Pittsburgh, PA (US)

(73) Assignee: Disney Enterprises, Inc., Burbank, CA (US)

(*) Notice: Subject to any disclaimer, the term of this patent is extended or adjusted under 35 U.S.C. 154(b) by 131 days.

(21) Appl. No.: 15/210,708

(22) Filed: Jul. 14, 2016

(65) Prior Publication Data
US 2017/0308756 A1   Oct. 26, 2017

Related U.S. Application Data

(60) Provisional application No. 62/327,951, filed on Apr. 26, 2016.

(51) Int. Cl.
G06K 9/62 (2006.01)
G06K 9/00 (2006.01)
(Continued)

(52) U.S. Cl.
CPC .......... *G06K 9/00751* (2013.01); *G06T 7/408* (2013.01); *G06T 7/602* (2013.01); *H04L 65/4069* (2013.01); *G06K 2009/00738* (2013.01); *G06T 2207/10016* (2013.01); *G06T 2207/10024* (2013.01); *G06T 2207/20081* (2013.01); *G06T 2207/20084* (2013.01)

(58) Field of Classification Search
CPC .................. G06K 9/00711–9/00765
See application file for complete search history.

(56) References Cited

U.S. PATENT DOCUMENTS

2017/0255832 A1* 9/2017 Jones ................. G06K 9/00771
2017/0262996 A1  9/2017 Jain

OTHER PUBLICATIONS

Somboon Hongeng et al., "Video-based event recognition: activity representation and probabilistic recognition methods", Computer Vision and Image Understanding 96 (2004) 129-162, Elsevier, Available online Aug. 13, 2004, pp. 129-162. (Year: 2004).*

(Continued)

*Primary Examiner* — Brian P Werner
(74) *Attorney, Agent, or Firm* — Farjami & Farjami LLP

(57) ABSTRACT

There is provided a system comprising a memory and a processor configured to receive a media content depicting an activity, extract a first plurality of features from a first segment of the media content, make a first prediction that the media content depicts a first activity based on the first plurality of features, wherein the first prediction has a first confidence level, extract a second plurality of features from a second segment of the media content, the second segment temporally following the first segment in the media content, make a second prediction that the media content depicts the first activity based on the second plurality of features, wherein the second prediction has a second confidence level, determine that the media content depicts the first activity based on the first prediction and the second prediction, wherein the second confidence level is at least as high as the first confidence level.

20 Claims, 6 Drawing Sheets

(51) Int. Cl.
    *H04L 29/06*     (2006.01)
    *G06T 7/40*      (2017.01)
    *G06T 7/60*      (2017.01)

(56) References Cited

OTHER PUBLICATIONS

Wu, et al. "Modeling spatial-temporal clues in a hybrid deep learning framework for video classification," *Proc. 23rd ACM Conf. Multimedia Conf.*, 2015. pp. 1-10.
Ng, et al. "Beyond Short Snippets: Deep Networks for Video Classification," *Cornell Univ. Lab.* Apr. 2015. arXiv:1503.08909. pp. 1-9.
Yeung, et al. Every Moment Counts: Dense Detailed Labelling of Actions in Complex Videos. *Cornell Univ. Lab.* 2015. arXiv:1507.05738. pp. 1-10.
Hoai, et al. "Max-Margin Early Event Detectors," International Journal Computer Vision, 2014. 107: 191. https://doi.org/10.1007/s11203-013-0683-3. pp. 1-8.
Jiang, Yu-Gang, et al. *Exploiting Feature and Class Relationships in Video Categorization with Regularized Deep Neural Networks,* IEEE Transactions on Pattern Analysis and Machine Intelligence, Feb. 2015. pp. 1-22.

* cited by examiner

US 10,061,986 B2

SYSTEMS AND METHODS FOR IDENTIFYING ACTIVITIES IN MEDIA CONTENTS BASED ON PREDICTION CONFIDENCES

RELATED APPLICATION(S)

The present application claims the benefit of and priority to a U.S. Provisional Patent Application Ser. No. 62/327,951, filed Apr. 26, 2016, which is hereby incorporated by reference in its entirety into the present application.

BACKGROUND

Video content has become a part of everyday life with an increasing amount of video content becoming available online, and people spending an increasing amount of time online. Additionally, individuals are able to create and share video content online using video sharing websites and social media. Recognizing visual contents in unconstrained videos has found a new importance in many applications, such as video searches on the Internet, video recommendations, smart advertising, etc. However, conventional approaches for recognizing activities in videos do not properly and efficiently make predictions of the activities depicted in the videos.

SUMMARY

The present disclosure is directed to systems and methods for identifying activities in media contents based on prediction confidences, substantially as shown in and/or described in connection with at least one of the figures, as set forth more completely in the claims.

DETAILED DESCRIPTION

Figure 1:
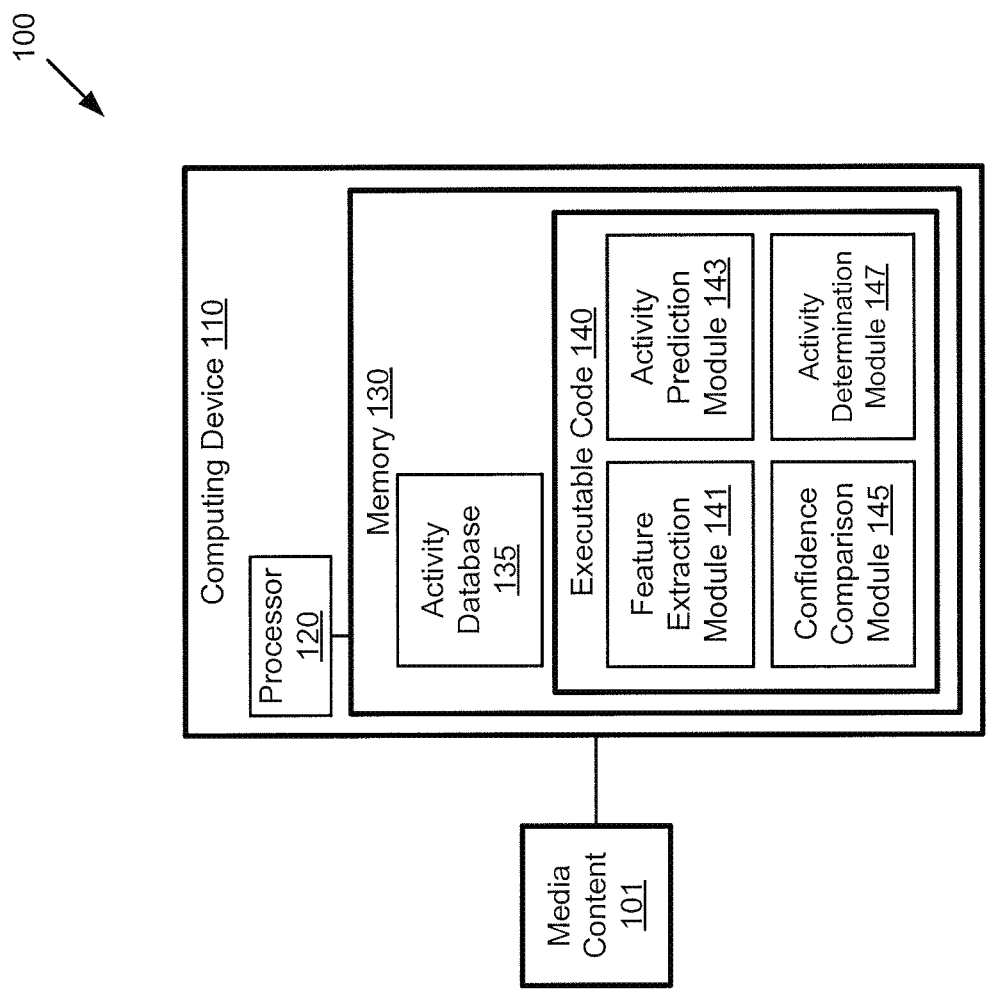
FIG. 1 shows a diagram of an exemplary system for identifying activities in a media content based on prediction confidences, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for identifying activities in a media content based on prediction confidences, according to one implementation of the present disclosure. System 100 includes media content 101 and computing device 110. Media content 101 may be a media content including a plurality of segments, and each segment may include one or more frames. Media content 101 may depict an activity, such as an athlete competing in a long-jump competition, an individual making pasta, sailing, using an automatic teller machine (ATM), etc., and may depict more than one activity. In one implementation, media content 101 may be include training content for training system 100 on identifying activities, which may include labels corresponding to activities shown in the training content and annotations marking the beginning and end of each activity shown in the training content. In one implementation, media content 101 may include testing content for testing system 100 on identifying activities in a media content. Training content may be different from testing content.

Computing device 110 includes processor 120 and memory 130. Processor 120 is a hardware processor, such as a central processing unit (CPU), used in computing device 110. Memory 130 is a non-transitory storage device for storing computer code for execution by processor 120, and also for storing various data and parameters. Memory 130 includes activity database 135 and executable code 140. Activity database 135 may be a database storing a plurality of activities and data to identify each activity of the plurality of activities in media content 101. Executable code 140 includes one or more software modules for execution by processor 120 of computing device 110. As shown in FIG. 1, executable code 140 includes feature extraction module 141, activity prediction module 143, confidence comparison module 145, and activity determination module 147.

Feature extraction module 141 is a software module stored in memory 130 for execution by processor 120 to extract various features from media content 101. In some implementations, feature extraction module 141 may extract object data from media content 101. Object data may include properties of one or more objects, such as a color of the object, a shape of the object, a size of the object, a size of the object relative to another element of media content 101 such as a person, etc. In some implementations, feature extraction module 141 may extract scene data form media content 101. Scene data may include a description of a setting of media content 101, such as outdoors or stage. Scene data may include properties of the scene, such as lighting, location, identifiable structures such as a stadium, etc. In some implementations, feature extraction module 141 may extract more generic visual information that may be directly relevant for activity prediction. In some implementations, image data may include texture, color, etc. Feature extraction module 141 may be a convolutional neural network (CNN) that computes visual features from each frame of media content 101. Feature extraction module 141 may include CNN architecture VGG19, and the output of the second fully connected layer (fc7) may be used as an input for activity prediction module 143.

Activity prediction module 143 is a software module stored in memory 130 for execution by processor 120 to predict one or more activities depicted in media content 101. In some implementations, activity prediction module 143 may base one or more predictions on features extracted from media content 101 using feature extraction module 141. Activity prediction module 143 may be trained on a plurality of activities, for example, using the ActivityNet dataset commonly available on the Internet. The ActivityNet dataset includes twenty-eight thousand (28,000) videos and provides samples from two-hundred and three (203) activity classes with an average of one-hundred and thirty-seven (137) untrimmed videos per class and one point four one (1.41) activity instances per video, totaling eight-hundred and forty-nine (849) video hours of training material. In one implementation, prior to training on ActivityNet, activity prediction module 143 may be pre-trained on the ImageNet dataset. ImageNet is an image database, available on the Internet, organized according to nouns in the WordNet hierarchy, in which each node of the hierarchy is depicted by thousands of images. Activity prediction module 143 may compare the features extracted from media content 101 with activity database 135 and, based on similarities between the extracted features and activities in activity database 135, activity prediction module 143 may predict one or more activities shown in media content 101.

In some implementations, activity prediction module 143 may indicate a confidence level for each prediction. The confidence level of a prediction may be indicated by a percent confidence, a number on a scale, such as a scale from one (1) to ten (10), where a lower number indicates a lower confidence that media content 101 depicts the predicted activity and a higher number indicates a higher confidence that media content 101 depicts the predicted activity, etc. Activity prediction module 143 may predict more than one activity for a segment of media content 101. For example, when media content 101 depicts an athlete at the beginning of a long jump, the first frames may include the athlete running on a track. Accordingly, activity prediction module 143 may predict that media content 101 depicts running and long jump. As the frames of media content 101 progress, activity prediction module 143 may make predictions for each subsequent frame. As the athlete proceeds towards the long jump landing pit, activity prediction module 143 may continue to predict both running and long jump, but the confidence level associated with each prediction may change, with the confidence in the long jump prediction increasing and the confidence in the running prediction decreasing. In some implementations, activity prediction module 143 may predict at least two activities for each frame of media content 101 such that, for each segment, there is a difference between the confidence level of the first prediction and the confidence level of the second prediction.

Confidence comparison module 145 is a software module stored in memory 130 for execution by processor 120 to compare the confidence of one activity prediction with the confidence of another activity prediction. Confidence comparison module 145 may compare confidence levels of predictions made by activity prediction module 143. In some implementations, confidence comparison module 145 may compare a first prediction of a first activity with a second prediction of the first activity. Confidence comparison module 145 may compare a magnitude of the first confidence level of the first prediction with a magnitude of the second prediction and determine a relative relationship between the first confidence level and the second confidence level.

In other implementations, confidence comparison module 145 may compare the difference between the confidence level of one prediction and the confidence level of another prediction. For example, when media content 101 shows a long jump, activity prediction module 143 may make a first prediction that media content 101 shows long jump and a second prediction the media content 101 shows running. Confidence comparison module 145 may compare the confidence level of the prediction that media content 101 shows long jump with the confidence level of the prediction that media content 101 shows running. In one implementation, confidence comparison module 145 may take the difference between the confidence level of the prediction that media content 101 shows long jump in a first segment and the confidence level that the prediction that media content 101 shows running in the first segment and compare that difference with the difference between the confidence level of the prediction that media content 101 shows long jump in a second segment and the confidence level that the prediction that media content 101 shows running in the second segment, where the second segment temporally follows the first segment in media content 101. Confidence comparison module 145 may compare the magnitude of the difference between predictions in the first segment with the magnitude of the difference between predictions in the second segment.

Activity determination module 147 is a software module stored in memory 130 for execution by processor 120 to determine an activity is shown in media content 101. Activity determination module 147 may determine that media content 101 depicts an activity based on the comparison of the confidence levels performed by confidence comparison module 145. Activity determination module 147 may determine that media content 101 depicts an activity when two or more sequential confidence level predictions are non-decreasing, as determined by confidence comparison module 145. For example, if activity predication module 143 predicts that media content 101 depicts the activity of long jump with a confidence level of four (4), and the subsequent prediction made by activity prediction module 143 has a confidence level of at least four (4), confidence comparison module 145 may determine that there is no difference between the first and second confidence level, and activity determination module 147 may determine that media content 101 depicts long jump. In one implementation, activity prediction module 143 may predict two or more activities are depicted by media content 101, and confidence comparison module 145 may find that each of the two or more activities has a non-decreasing prediction confidence level in subsequent segments of media content 101. In such a situation, activity determination module 147 may determine that media content 101 depicts the activity having the highest confidence level.

In some implementations, activity determination module 147 may determine that media content 101 shows more than one activity. Media content 101 may show a plurality of activities at the same time or a plurality of activities sequentially. In some implementations, an activity may be a multi-step activity. For example, the activity of making pasta may involve cutting vegetables, placing a pot of water on a stove, boiling the water in the pot using the stove, cooking pasta noodles in the boiling water, cooking pasta sauce, and combining the cooked pasta with the cooked sauce. For such a long and complex activity, activity determination module 147 may be trained on each step individually, and may be trained to determine the more complex and/or abstract activity of making pasta based on the presence of each of a plurality of necessary steps, either in a predefined sequence or as an unordered combination of activities. Activity determination module 147 may identify transitions between various activities, such as when the confidence level of the prediction of one activity begins to diminish at the same time that the confidence level of a prediction of a second activity rises, there may be a transition from the first activity to the second activity in media content 101. Similarly, activity determination module 147 may determine a beginning of an activity and/or an end of an activity based on the confidence levels of the predictions made by activity prediction module 143.

Figure 2:
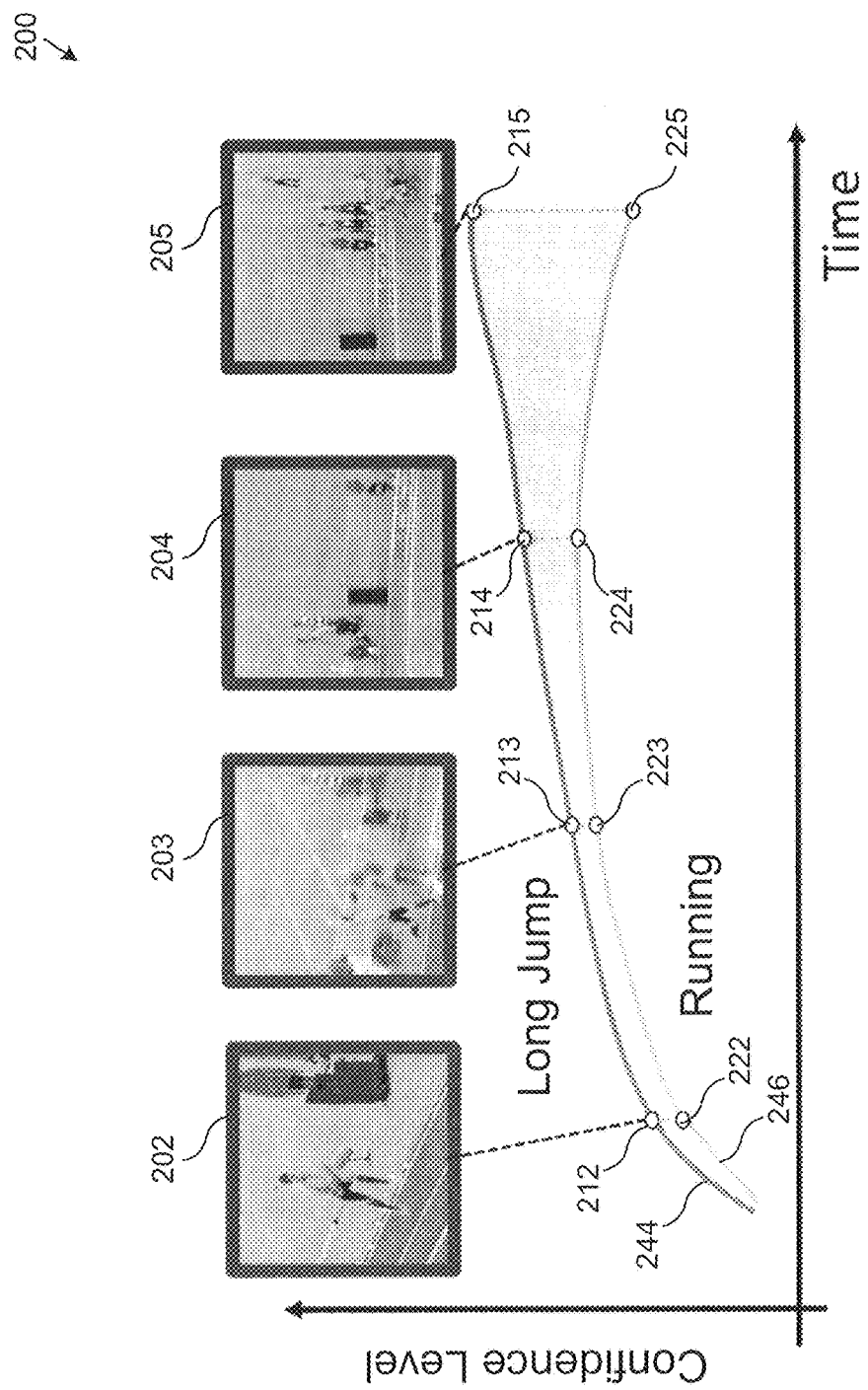
FIG. 2 shows a diagram of frames from an exemplary media content and associated predictions, according to one implementation of the present disclosure.

FIG. 2 shows a diagram of frames of media content 101 and associated activity predictions, according to one implementation of the present disclosure. Diagram 200 shows frame 202, frame 203, frame 204, and frame 205 of media content 101. Prediction confidence level 244 shows the confidence level of the prediction that media content 101 shows long jump. Prediction confidence level 246 shows the confidence level of the prediction that media content 101 shows running. Data points 212 and 222 correspond to the confidence levels of long jump and running, respectively, shown in frame 202. Data points 213 and 223 correspond to the confidence levels of long jump and running, respectively, shown in frame 203, with the confidence level of each activity increasing between frame 202 and frame 203 and the difference between confidence level 213 and 223 remaining substantially the same as the difference between the confidence level indicated by data point 212 and the confidence level indicated by data point 213.

Data points 214 and 224 correspond to the confidence levels of long jump and running, respectively, shown in frame 204, with the confidence level of each activity increasing between frame 203 and frame 204. However, the increase in confidence level 246 is substantially less than the increase in confidence level 244 between frame 203 and frame 204. Accordingly, the difference between confidence level 244 indicated by data point 214 and confidence level 246 indicated by data point 224 is substantially greater than the difference between confidence level 244 indicated by data point 213 and confidence level 244 indicated by data point 214. The change in difference between confidence levels 244 and 246 indicates that running is likely not the activity depicted in media content 101. The change in confidence levels 244 and 246 continues for frame 205, with confidence level 246 indicated by data point 225 being lower than confidence level 246 indicated by data point 224, resulting in a violation of the requirement of a non-decreasing confidence level. On the other hand, confidence level 244 fulfills the requirement, with data point 215 indicating a higher confidence level than data point 214 that the activity depicted is long jump. Similarly, the difference between confidence level 244 and 246 in frame 205 is greater than the difference between confidence level 244 and 246 is greater in frame 204.

Figure 3:
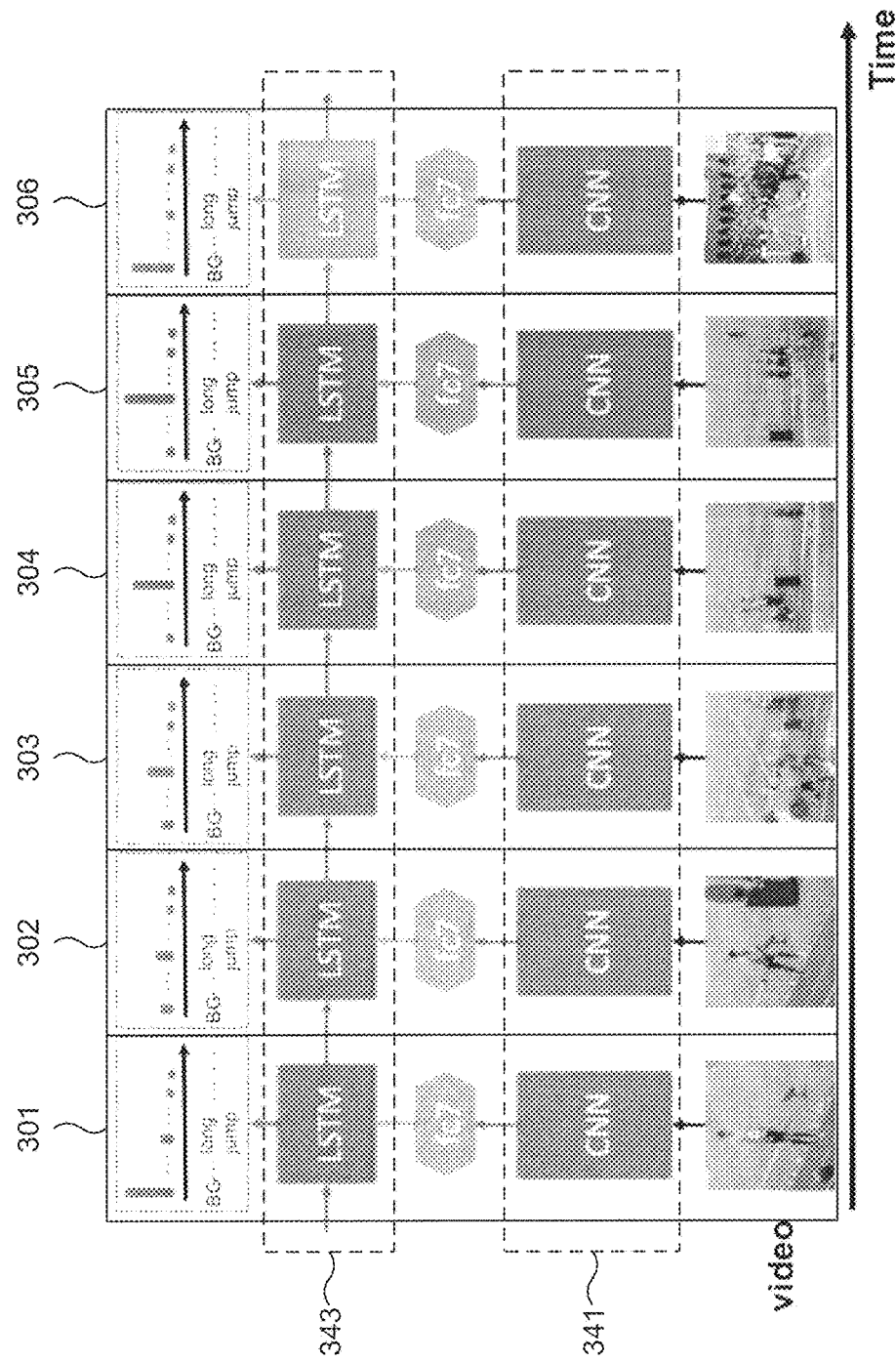
FIG. 3 shows a diagram of an exemplary sequence of identifying an activity using the system of FIG. 1, according to one implementation of the present disclosure.

FIG. 3 shows a diagram of an exemplary sequence of identifying an activity using the system of FIG. 1, according to one implementation of the present disclosure. At each video frame, feature extraction module 341 extracts features, labeled as fc7, and transmits the features to activity prediction module 343 to generate predictions for the activity shown in media content 101 and compute confidence levels of the predictions of activities and non-activity. As shown in FIG. 3, non-activity is indicated by the label BG. FIG. 3 illustrates the way feature extraction module 341 and activity prediction module 343 work together. In some implementations, feature extraction module 341 may be a CNN that computes visual features from each video frame, and activity prediction module 343 may be a Recurrent Neural Network (RNN), a long short-term memory (LSTM), etc. In one implementation, activity prediction module 343 may be an LSTM having a linear layer that computes activity confidence levels based on the features extracted from the current frame and the hidden states and memory of the LSTM from the previous time step. In some implementations, feature extraction module 341 may use the CNN architecture VGG19 in which the output of the second fully connected layer (fc7) may be transmitted to activity prediction module 343. In some implementations, activity prediction module 343 may apply dropout on non-recurrent connections.

As shown in FIG. 3, frames 301 through 305 depict an athlete performing a long jump, beginning by running down the approach track and then jumping into the landing pit. In frame 301, the confidence level that frame 301 depicts no activity BG is high, and the confidence that frame 301 depicts long jump is relatively low. As media content 101 progresses, the confidence level that media content 101 shows long jump increases in each subsequent frame of frames 301 through 305. Frame 306 shows a different view of the scene, including a judge and a view of the audience in the stands. In frame 306, the confidence level of long jump has significantly diminished, and the confidence level in no activity BG is very high.

Figure 4:
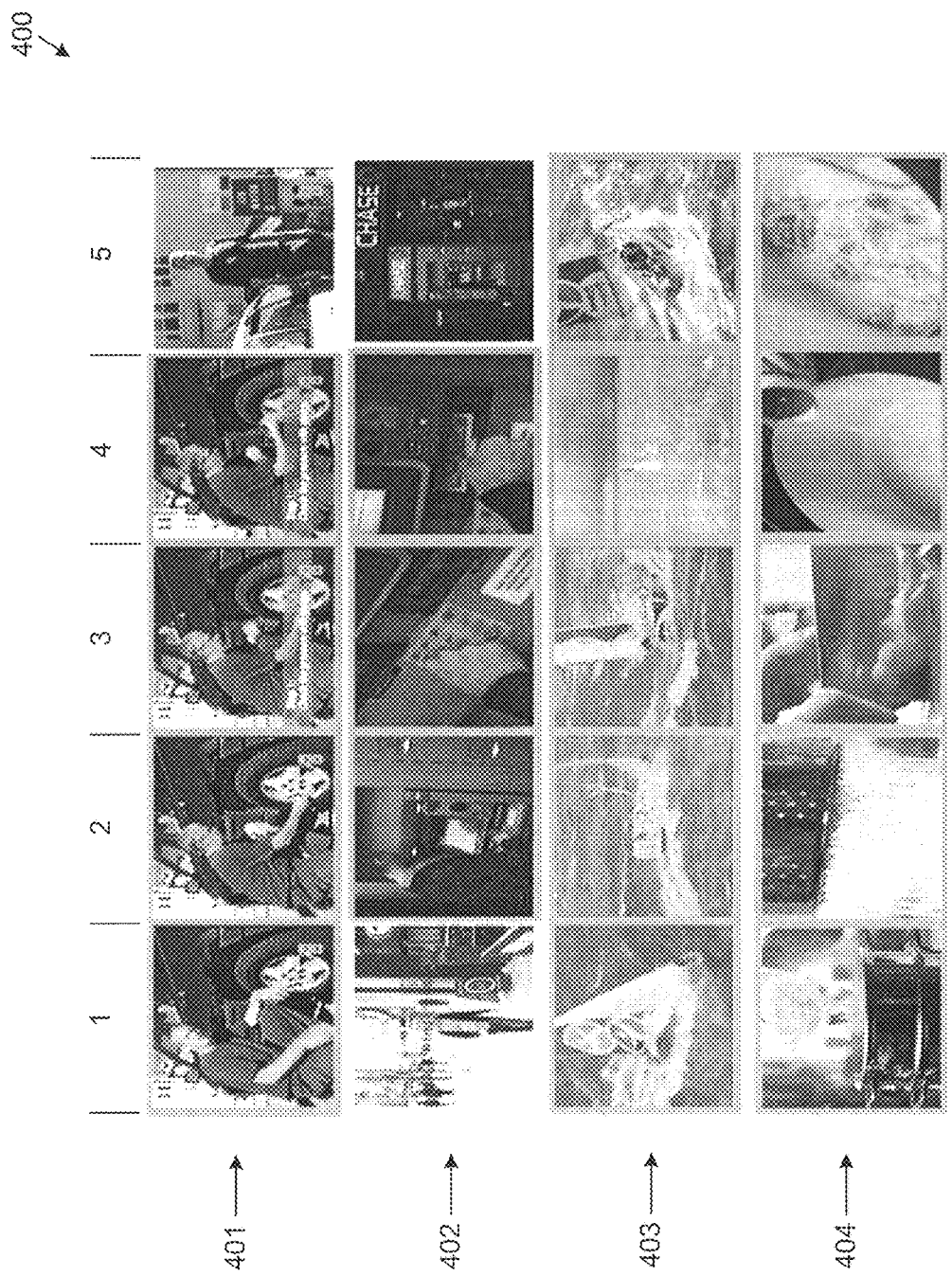
FIG. 4 shows a diagram of exemplary activities identified using the system of FIG. 1, according to one implementation of the present disclosure.

FIG. 4 shows a diagram of exemplary activities identified using the system of FIG. 1, according to one implementation of the present disclosure. Diagram 400 includes five frames from each of media content 401, media content 402, media content 403, and media content 404. Each of media contents 401-404 is included in the ActivityNet dataset. Media content 401 shows a series of frames depicting the activity of checking a tire. Frames one (1) through four (4) of media content 401 include a bold border, indicating that the content of frames one (1) through four (4) result in activity predictions that have confidence levels that do not decrease between subsequent frames. Frame five (5) of media content 401 does not have a bold border, indicating that the confidence level of the activity predicted for frame four (4) of media content 401 is higher than the confidence level of the activity predicted for frame five (5) of media content 401.

Media content 402 shows a series of frames depicting the activity of using an ATM. Frames two (2) through four (4) of media content 402 include bold borders indicating that the images depicted in frames two (2) through four (4) result in activity predictions that have confidence levels that do not decrease between subsequent frames. Frames one (1) and five (5) of media content 402 do not have a bold border, indicating that activity prediction module 143 does not predict the same activity in frame one (1) and frame two (2) with non-decreasing confidence, and activity prediction module 143 does not predict the same activity in frame four (4) and frame five (5) with non-decreasing confidence. Media content 403 shows a series of frames depicting the activity of sailing. Frames one (1) through five (5) include a bold border indicating that activity predication module 143 may indicate a confidence level with non-decreasing confidence.

Media content 404 shows a series of frames depicting the activity of making pasta. Similar to media content 403, all five frames of media content 404 include a bold border. However, each frame of media content 404 depicts a different part of making pasta, but activity prediction module 143 may recognize the sequence of activities as making pasta and indicate that each frame is part of the larger activity. In some implementations, system 100 may be able to correctly predict the activities shown in media contents 401-404, even with significant viewpoint and foreground object changes between the frames, as demonstrated by the predictions of media content 402, media content 403, and media content 404.

Figure 5:
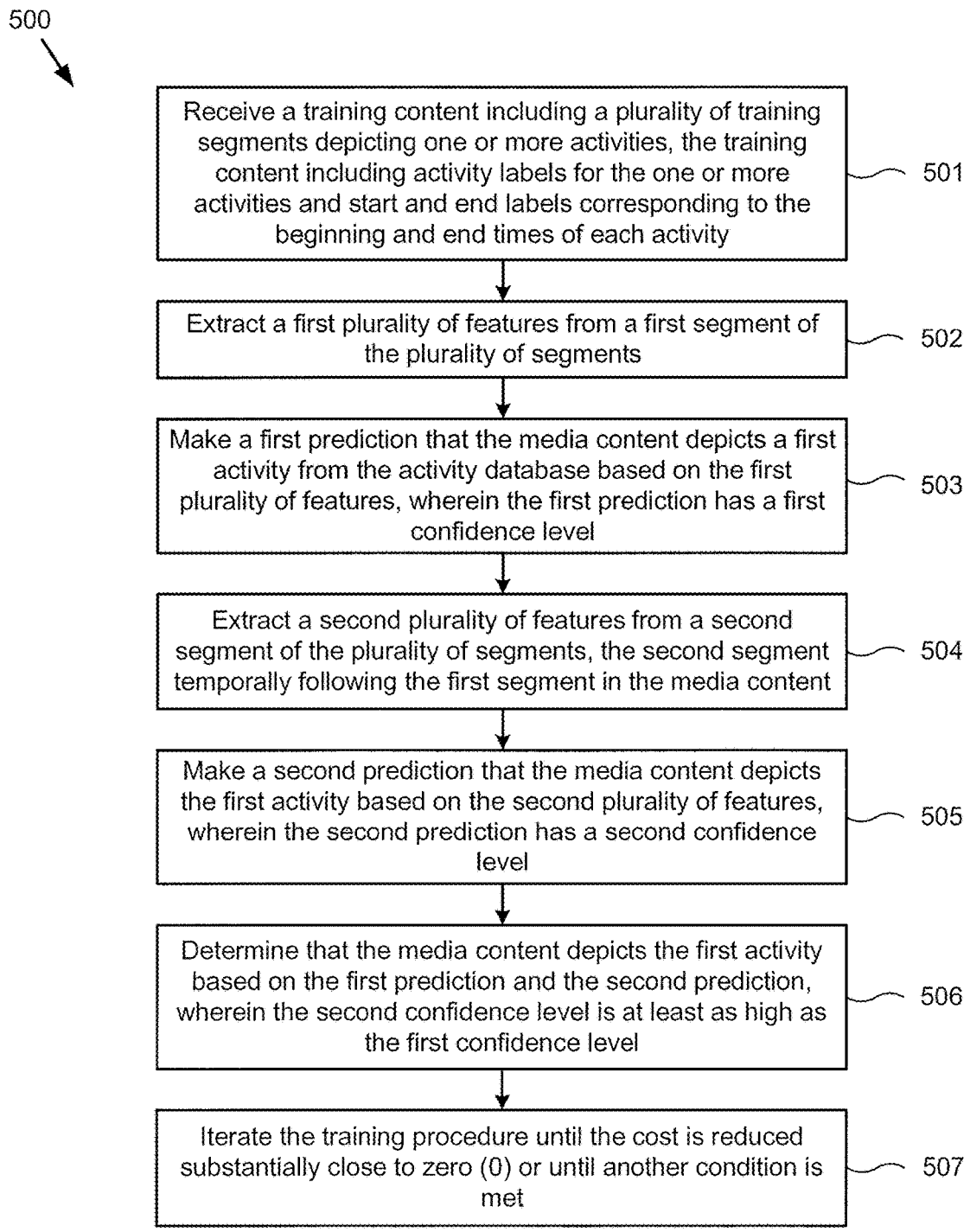
FIG. 5 shows a flowchart illustrating an exemplary method of training the system of FIG. 1 for identifying activities in media content based on prediction confidences, according to one implementation of the present disclosure.

FIG. 5 shows a flowchart illustrating an exemplary method of training system 100 for identifying activities in media content 101 based on prediction confidences, according to one implementation of the present disclosure. Method 500 begins at 501, where executable code 140 receives a training content including a plurality of training segments depicting one or more activities, the training content including activity labels for the one or more activities and start and end labels corresponding to the beginning and end times of each activity. In some implementations, each segment of the training content may depict part of an activity, such that the training content depicts one activity. In other implementations, the training content may depict a plurality of activities with one or more activities appearing in different segments of the training content. For example, the training content may show an athlete competing in a long jump contest, with one or more segments depicting the athlete running prior to one or more segments of the training content depicting the athlete jumping.

At 502, executable code 140 extracts a first plurality of features from a first segment of the plurality of segments of the training content. The first segment may include one or more frames of the training content. Feature extraction module 141 may extract visual features from the training content including object data, scene data, and/or other data that may be helpful in predicting activities depicted in the training content. In some implementations, object data may include color data, size data, position data, velocity data, or other data related to an object shown in the training content. Scene data may include information related to the scene or setting of an activity shown in the training content. For example, scene data may include lighting data, location data related to identifiable locations shown in median content 101, such as a kitchen, data related to identifiable structures in shown in the training content, such as a stadium, etc. Feature extraction module 141 may extract other relevant features from the training content that may be useful in predicting or identifying activities depicted therein.

At 503, executable code 140 makes a first prediction that the training content depicts a first activity from activity database 135 based on the first plurality of features, wherein the first prediction has a first confidence level. Activity prediction module 143 may be trained on a plurality of activities. In some implementations, activity prediction module 143 may be trained using the ActivityNet dataset including twenty-eight thousand (28,000) videos and provides samples from two-hundred and three (203) activity classes with an average of one-hundred and thirty-seven (137) untrimmed videos per class and one point four one (1.41) activity instances per video. During training, activity prediction module 143 may introduce ranking loss into the learning objective to explicitly capture activity progression globally from the activity start to the current time:

$$\mathcal{L}^t = \mathcal{L}_c^t + \lambda_r \mathcal{L}_r^t \qquad (1)$$

where $L_c^t$ and $L_r^t$ are the classification loss and the ranking loss, respectively, at the current time t, and $\lambda_r$ is a positive scalar constant. For training deep models, the cross entropy loss may be used to formulate $L_c^t$:

$$\mathcal{L}_c^t = -\log p_t^{y_t} \qquad (2)$$

where $y_t$ is the ground truth activity category of the training video sequence at the $t^{th}$ video frame, and $p_t^{y_t}$ is the confidence level of the ground truth label $y_t$ for the $t^{th}$ frame, i.e., the softmax output of the model.

In training, activity prediction module 143 may compute the gradient of the ranking loss with respect to the softmax output at each time step:

$$\frac{\partial \mathcal{L}^t}{\partial p_t^y} = \frac{\partial \mathcal{L}_c^t}{\partial p_t^y} + \lambda_r \frac{\partial \mathcal{L}_r^t}{\partial p_t^y} \qquad (3)$$

which may then be back propagated through time to compute the gradients with respect to the model parameters. In some implementations, the ranking loss of non-activity frames may be assigned a value of zero (0). Although $L_s^t$ and $L_m^t$ are also functions of $p_{t'}^y$ for t'<t, i.e., the softmax output of previous time steps, activity prediction module 143 may not compute and back propagate the gradients of the ranking loss with respect to these variables in order to simplify computation. Method 500 continues at 504, where executable code 140 extracts a second plurality of features from a second segment of the plurality of segments, the second segment temporally following the first segment in the training content. The second segment may include one or more frames of the training content. At 505, executable code 140 makes a second prediction that the media content depicts the first activity based on the second plurality of features, wherein the second prediction has a second confidence level.

At 506, executable code 140 determines that the training content depicts the first activity based on the first prediction and the second prediction, wherein the second confidence level is at least as high as the first confidence level. In one implementation, activity determination module 147 may determine that the confidence level of the second prediction is at least as confident as the first confidence level when the magnitude of the second confidence level is at least as great as the magnitude of the first confidence level. In some implementations, activity determination module 147 may require that subsequent predictions produce monotonically non-decreasing confidence levels for the predicted activity as activity determination module 147 progresses through the training content. In some implementations, to ensure the result is a non-decreasing function, activity determination module 147 may introduce the ranking loss $L_s^t$ into the learning objective at time step t as:

$$\mathcal{L}_s^t = \max(0, -\delta_t \cdot (p_{t-1}^{*y_t} - p_t^*)) \qquad (4)$$

where t is set to 1 if $y_{t-1} = y_t$, i.e., when there is no activity transition from t−1 to t according to ground truth labeling (e.g. $\delta_t = 1$ for $t_a$, $t_b$ and t in FIG. 4); otherwise, t is set to −1.

In equation (4), $p_t^*$ is computed as:

$$p_t^* = \begin{cases} p_t^{*y_t}, & \text{if } \delta_t = 1, \\ 0, & \text{otherwise} \end{cases} \qquad (5)$$

where $$p_t^{*y_t} = \max_{t' \in [t_s, t-1]} p_{t'}^{y_t}, \qquad (6)$$

$$t_s = \min\{t' \mid y_{t'}, = y_t, \forall\, t' \in [t_s, t]\}, \qquad (7)$$

where $t_s$ is the starting point of the current activity $y_t$, and $p_t^*$ is the highest previous confidence level in $[t_s, t-1]$ (illustrated by the dashed horizontal line in FIG. 4). For example, if there is no activity transition at time t, i.e. $y_t = y_{t-1}$, then the current confidence level should be no less than any previous confidence level for the same activity, computing the ranking loss as:

$$\mathcal{L}_s^t = \max(0, p_t^{*y_t} - p_t^{y_t}) \quad (8)$$

On the other hand, if an activity transition happens at time t, i.e. $y_t \neq y_{t-1}$, the confidence level of the previous activity may drop to zero at t and activity prediction module 143 may compute the ranking loss as:

$$\mathcal{L}_s^t = p_t^{y_{t-1}} \quad (9)$$

When more of an activity is observed, activity prediction module 143 may become more confident in discriminating between the correct activity and incorrect activities. In some implementations, executable code 140 may implement the ranking loss:

$$\mathcal{L}_m^t = \max(0, \delta_t \cdot (m_t^{y_{t-1}} - m_t^*)) \quad (10)$$

where $m_t^y$ is the discriminative margin of an activity label y at time step t, computed as:

$$m_t^y = p_t^y - \max\{p_t^{y'} | \forall y' \in \mathcal{Y}, y' \neq y\} \quad (11)$$

where Y is the set of all activity category labels. The $m_t^*$ in Equation 10 is computed as:

$$m_t^* = \begin{cases} m_t^{*y_t}, & \text{if } \delta_t = 1, \\ 0, & \text{otherwise} \end{cases} \quad (12)$$

where $m_t^{*y_t}$ is computed as:

$$m_t^{*y_t} = \max_{t' \in [t_s, t-1]} m_{t'}^{y_t} \quad (13)$$

which is the largest previous discriminative margin of the current activity $y_t$ that started at $t_s$. In other words, when there is no activity transition at t, the current discriminative margin may be no less than any previous margin in the same activity. Executable code 140 may compute the ranking loss as:

$$\mathcal{L}_m^t = \max(0, m_t^{*y_t} - m_t^{y_t}) \quad (14)$$

If an activity transition happens at time t, the discriminative margin of the previous activity may drop, and activity prediction module 143 may compute the ranking loss as:

$$\mathcal{L}_m^t = m_t^{y_{t-1}} \quad (15)$$

At 507, executable code 140 iterates the training procedure until the discriminative margin is reduced substantially close to zero (0), or until another condition is met, such as a particular number of iterations is reached.

Figure 6:
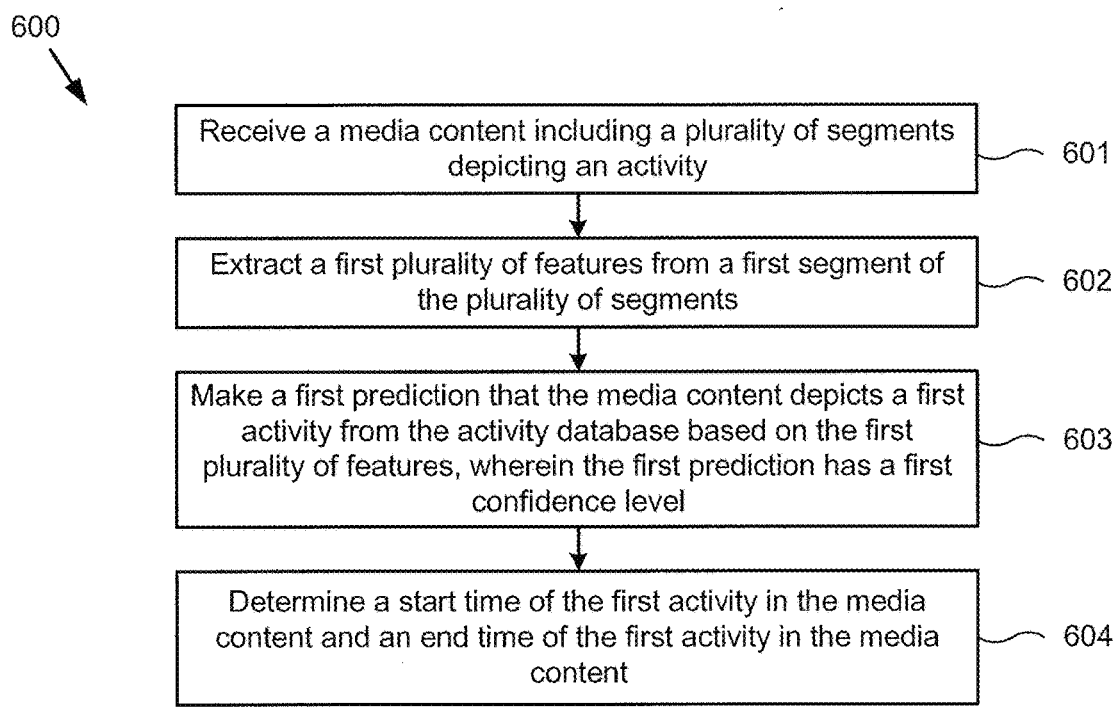
FIG. 6 shows a flowchart illustrating an exemplary method of identifying activities in a media content based on prediction confidences, according to one implementation of the present disclosure.

FIG. 6 shows a flowchart illustrating an exemplary method of identifying activities in media content 101 based on prediction confidences, according to one implementation of the present disclosure. Method 600 begins at 601, where executable code 140 receives media content 101 including a plurality of segments depicting one or more activities. In some implementations, each segment of media content 101 may depict part of an activity, such that media content 101 depicts one activity. In other implementations, media content 101 may depict a plurality of activities with one or more activities appearing in different segments of media content 101. For example, media content 101 may show an athlete competing in a long jump contest, with one or more segments depicting the athlete running prior to one or more segments of media content 101 depicting the athlete jumping.

At 602, executable code 140 extracts a first plurality of features from a first segment of the plurality of segments of media content 101. The first segment may include one or more frames of media content 101. Feature extraction module 141 may extract visual features from media content 101 including object data, scene data, and/or other data that may be helpful in predicting activities depicted in media content 101. In some implementations, object data may include color data, size data, position data, velocity data, or other data related to an object shown in media content 101. Scene data may include information related to the scene or setting of an activity shown in media content 101. For example, scene data may include lighting data, location data related to identifiable locations shown in median content 101, such as a kitchen, data related to identifiable structures in shown in media content 101, such as a stadium, etc. Feature extraction module 141 may extract other relevant features from media content 101 that may be useful in predicting or identifying activities depicted therein.

At 603, executable code 140 makes a first prediction that media content 101 depicts a first activity from activity database 135 based on the first plurality of features, wherein the first prediction has a first confidence level. In some implementations, the activity prediction module 143 may compare the first plurality of features extracted from the first segment with features learned during training and stored in activity database 135. Activity prediction module 143 may determine the confidence of the first prediction based on the comparison. In some implementations, activity prediction module 143 may predict a plurality of activities for the first segment, and each activity may have a corresponding confidence. For example, activity prediction module may predict that the first segment depicts walking, running, and long jump, with the activities having confidences of 20%, 35%, and 45%, respectively.

At 604, executable code 140 determines a start time of the first activity in media content 101 and an end time of the first activity in media content 101. Activity determination module 147 may determine the start time of a first activity in media content 101 when the confidence level of two subsequent segments of media content 101 indicate the first activity is shown. In some implementations, the start time of the activity may be the beginning of media content 101. For example, when media content 101 depicts sailing, the first segment may indicate sailing with a confidence level, and the second segment may indicate sailing with the same confidence level. As a result of the first two segments satisfying the condition for non-decreasing confidence level of the activity, activity determination module 147 may determine the start time of sailing in media content 101 is the first segment of media content 101. In other implementations, the activity may not be included in the first one or more segments of media content 101. In such a situation, activity determination module 147 may determine the start time of the activity is the first of two or more segments that satisfy the monotonicity requirement. Similarly, the end time may be determined to occur when two or more sequential segments of media content 101 that occur after the start time of the first activity do not meet the monotonicity requirement, indicating a decreasing confidence that the activity is depicted in media content 101.

In some implementations, media content 101 may depict more than one activity, such as one activity followed by another activity. To determine the start time of the second activity, activity determination module 147 may determine the second activity has started when the confidence levels of the first activity do not satisfy the monotonicity requirement and the confidence levels of the second activity do satisfy the monotonicity requirement. For example, media content 101 may depict cutting vegetables followed by placing a pot of water on a stove. To determine the start time for placing a pot of water on a stove, activity determination module 147 may determine an end time for cutting vegetables, and determine the start time for placing a pot of water on a stove is the first of at least two sequential segments of media content 101 depicting placing a pot of water on a stove following the end time of cutting vegetables.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing an executable code and an activity database; and
   a hardware processor executing the executable code to:
   receive a media content including a plurality of segments depicting an activity;
   extract a first plurality of features from a first segment of the plurality of segments;
   make a first prediction that the media content depicts a first activity from the activity database based on the first plurality of features, wherein the first prediction has a first confidence level;
   extract a second plurality of features from a second segment of the plurality of segments, the second segment temporally following the first segment in the media content;
   make a second prediction that the media content depicts the first activity based on the second plurality of features, wherein the second prediction has a second confidence level;
   make a third prediction that the media content depicts a second activity, the third prediction having a third confidence level based on the first plurality of features and a fourth confidence level based on the second plurality of features;
   compare a first difference between the first confidence level and the third confidence level with a second difference between the second confidence level and the fourth confidence level; and
   determine that the media content depicts the first activity based on when the comparing indicates that the second difference is at least as much as the first difference based on, wherein the second confidence level is at least as high as the first confidence level.

2. The system of claim 1, wherein the first segment is a first frame of the media content and the second segment is a second frame of the media content.

3. The system of claim 1, wherein the second segment is a segment immediately following the first segment in the media content.

4. The system of claim 1, wherein determining the media content depicts the first activity includes comparing a magnitude of the first confidence with a magnitude of the second confidence.

5. The system of claim 1, wherein the determining that the media content depicts the first activity is further based on the first confidence level being higher than the third confidence level.

6. The system of claim 1, wherein a prediction is made for each frame of the media content and each prediction that has a preceding prediction is compared to the preceding prediction to determine that the media content depicts the first activity.

7. The system of claim 1, wherein the first activity includes a plurality of steps.

8. The system of claim 1, wherein the hardware processor executes the executable code to:
   determine a start time of the first activity in the media content based on the first confidence level and the second confidence level.

9. The system of claim 1, wherein the hardware processor executes the executable code to:
   determine an end time of the first activity in the media content based on the first confidence level and the second confidence level.

10. The system of claim 1, wherein the system uses a Recurrent Neural Network (RNN) for predicting the media content depicts the first activity and determining a corresponding confidence level.

11. A method for use with a system including a non-transitory memory and a hardware processor, the method comprising:
    receiving, using the hardware processor, a media content including a plurality of segments depicting an activity;
    extracting, using the hardware processor, a first plurality of features from a first segment of the plurality of segments;
    making, using the hardware processor, a first prediction that the media content depicts a first activity from the activity database based on the first plurality of features, wherein the first prediction has a first confidence level;
    extracting, using the hardware processor, a second plurality of features from a second segment of the plurality of segments, the second segment temporally following the first segment in the media content;
    making, using the hardware processor, a second prediction that the media content depicts the first activity based on the second plurality of features, wherein the second prediction has a second confidence level;
    making, using the hardware processor, a third prediction that the media content depicts a second activity, the third prediction having a third confidence level based on the first plurality of features and a fourth confidence level based on the second plurality of features;
    comparing, using the hardware processor, a first difference between the first confidence level and the third confidence level with a second difference between the second confidence level and the fourth confidence level; and
    determining, using the hardware processor, that the media content depicts the first activity based on when the comparing indicates that the second difference is at least as much as the first difference based on, wherein the second confidence level is at least as high as the first confidence level.

12. The method of claim 11, wherein the first segment is a first frame of the media content and the second segment is a second frame of the media content.

13. The method of claim 11, wherein the second segment is a segment immediately following the first segment in the media content.

14. The method of claim 11, wherein determining the media content depicts the first activity includes comparing a magnitude of the first confidence with a magnitude of the second confidence.

15. The method of claim 11, wherein the determining that the media content depicts the first activity is further based on the first confidence level being higher than the third confidence level.

16. The method of claim 11, wherein a prediction is made for each frame of the media content and each prediction that has a preceding prediction is compared to the preceding prediction to determine that the media content depicts the first activity.

17. The method of claim 11, wherein the first activity includes a plurality of steps.

18. The method of claim 11, further comprising:
determining, using the hardware processor, a start time of the first activity in the media content based on the first confidence level and the second confidence level.

19. The method of claim 11, further comprising:
determining, using the hardware processor, an end time of the first activity in the media content based on the first confidence level and the second confidence level.

20. The method of claim 11, further comprising:
determining, using the hardware processor, the media content depicts the first activity when only a portion of the first activity is shown.

* * * * *